US009718443B2

(12) United States Patent
Friscioni

(10) Patent No.: US 9,718,443 B2
(45) Date of Patent: Aug. 1, 2017

(54) WINDSCREEN WIPER DEVICE

(71) Applicant: FEDERAL-MOGUL S.A., Aubange (BE)

(72) Inventor: Thomas Friscioni, Aumetz (FR)

(73) Assignee: Federal-Mogul S.A., Aubange (BE)

(*) Notice: Subject to any disclaimer, the term of this patent is extended or adjusted under 35 U.S.C. 154(b) by 0 days.

(21) Appl. No.: 14/784,159

(22) PCT Filed: May 2, 2013

(86) PCT No.: PCT/EP2013/059180
§ 371 (c)(1),
(2) Date: Oct. 13, 2015

(87) PCT Pub. No.: WO2014/177219
PCT Pub. Date: Nov. 6, 2014

(65) Prior Publication Data
US 2016/0052491 A1     Feb. 25, 2016

(51) Int. Cl.
*B60S 1/38*     (2006.01)
*B60S 1/04*     (2006.01)

(52) U.S. Cl.
CPC ........... *B60S 1/3853* (2013.01); *B60S 1/0444* (2013.01); *B60S 1/3879* (2013.01); *B60S 2001/382* (2013.01); *B60S 2001/3836* (2013.01)

(58) Field of Classification Search
CPC ........ B60S 1/38; B60S 1/3879; B60S 1/3877; B60S 2001/3836; B60S 2001/3827; B60S 1/382
USPC ........................... 15/250.48, 250.451, 250.44
See application file for complete search history.

(56) References Cited

U.S. PATENT DOCUMENTS 3,140,501 A * 7/1964 MacPherson ......... B60S 1/3801
                                                    15/250.44
3,414,930 A * 12/1968 Mitsuru ................ B60S 1/3801
                                                    15/250.48
5,231,730 A * 8/1993 Schmid .................. B60S 1/3801
                                                    15/250.31

(Continued)

FOREIGN PATENT DOCUMENTS

DE    10 2005 059432 A1    6/2007
EP         0465095 A1 *    1/1992
(Continued)

OTHER PUBLICATIONS

Machine translation of description portion of Japanese publication JP9193750, publication date Jul. 29, 1997.*

*Primary Examiner* — Gary Graham
(74) *Attorney, Agent, or Firm* — Robert L. Stearns; Dickinson Wright, PLLC

(57)     ABSTRACT

A windscreen wiper device (1) of the flat blade type includes an elastic, elongated carrier element, as well as an elongated wiper blade (2) of a flexible material, which can be placed in abutment with a windscreen to be wiped, which wiper blade (2) includes at least one longitudinal groove (3) on its longitudinal sides, in which groove (3) a longitudinal strip (4) of the carrier element is disposed, which windscreen wiper device comprises a connecting device (7) for an oscillating arm (8). A wall of the groove (3) facing towards the strip (4) and/or a longitudinal side of the strip (4) facing towards the wall is/are provided with a noise dampening profile along at least a part of its/their length.

9 Claims, 5 Drawing Sheets

(56) References Cited

U.S. PATENT DOCUMENTS

| | | |
|---|---|---|
| 2003/0138655 A1 | 7/2003 | Watanabe |
| 2010/0024150 A1* | 2/2010 | Kraemer .................. B60S 1/381 |
| | | 15/250.201 |
| 2012/0284949 A1 | 11/2012 | Kraemer |

FOREIGN PATENT DOCUMENTS

| | | | |
|---|---|---|---|
| FR | 2 923 788 A1 | | 5/2009 |
| GB | 2093339 A | * | 9/1982 |
| JP | S61 70172 U | | 5/1986 |
| JP | 9193750 | * | 7/1997 |

* cited by examiner

WINDSCREEN WIPER DEVICE

BACKGROUND OF THE INVENTION

1. Technical Field

The present invention relates to a windscreen wiper device of the flat blade type comprising an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, which windscreen wiper device comprises a connecting device for an oscillating arm.

2. Related Art

Free ends of the strip or "flexor" are preferably connected to a respective connecting piece or "end cap", wherein the wiper blade is preferably provided with a spoiler at a side thereof facing away from the windscreen to be wiped.

Such a windscreen wiper device is generally known. The prior art windscreen wiper device is in particular designed as a "flat blade" or "yokeless blade", wherein use is no longer made of several yokes pivotally connected to each other, but wherein the wiper blade is biased by the carrier element, as a result of which it exhibits a specific curvature.

A disadvantage of the known windscreen wiper device is the following. In practice the oscillating arm is connected to a mounting head fixed for rotation to a shaft driven by a small motor. In use, the shaft rotates alternately in a clockwise and in a counter-clockwise sense carrying the mounting head into rotation also, which in turn draws the oscillating arm into rotation and by means of the connecting device moves the wiper blade. A tilting web of a wiping lip of the wiper blade acts as an intermediate part subjected to a force in accordance with the wiping direction. the force acts solely on the tilting web, so that the wiping lip is guided in opposite direction to the wiping direction. Particularly, the tilting web is strip-shaped, whereas the wiping lip is triangular in shape.

However, the oscillatory movement of the wiping lip along the windscreen to be wiped results in a significant "rattling" noise or reversal noise, particularly as a consequence of the wiping lip being tumbled over at each turning point of its oscillatory movement.

SUMMARY OF THE INVENTION AND ADVANTAGES

It is an object of the invention to improve the prior art, that is to provide a windscreen wiper device wherein the above disadvantage is obviated at minimum costs.

It is noted that the present invention is not restricted to windscreen wiper devices for cars, but that it also relates to windscreen wiper devices for rail coaches and all other (fast) vehicles.

In order to accomplish that objective, a windscreen wiper device of the kind referred to in the introduction according to the invention is characterized in that a wall of the groove facing towards the strip and/or a longitudinal side of the strip facing towards the wall is/are provided with a noise dampening profile along at least a part of its/their length. In other words, a noise dampening profile is provided between the wall and the strip, i.e. on the wall and/or on the strip facing towards each other. Preferably, the longitudinal side of the strip is formed by a side thereof in use extending parallel to a windscreen to be wiped. Particularly, the noise dampening profile forming an integral part of the wall comprises several ribs engaging the strip, wherein adjacent ribs define a noise trapping chamber. the noise trapping chamber is thus formed between neighboring ribs of the noise dampening profile. The significant "rattling" noise waves or reversal noise waves resulting from the oscillatory movement of the wiper blade along the windscreen to be wiped are thus trapped or locked in the chamber or cavity avoiding noise propagation. the ribs preferably extend in longitudinal direction of the wiper blade, more preferably along the entire length thereof. the noise trapping chamber then also extends in longitudinal direction of the wiper blade, as if it were a channel. In cross-sectional view of the wiper blade the chamber preferably has a trapezoidal form or a curved form. Particularly, the ribs are tapered towards the strips. More particularly, the ribs each allow a linear contact surface with the strips.

The present invention is particularly based on the awareness that the noise dampening profile may compensate the variation of the pressure as exerted on the wiper blade by the oscillating arm. Thus, the actual pressure exerted on the wiper blade by the oscillating arm is constant, seen along the length of the wiper bade, resulting in less noise. the noise dampening profile has the unexpected advantage that sticking of the wall (particularly made of an elastomer material) onto the strip is avoided or at least significantly reduced both in summer under hot conditions when the material of the wall becomes soft and sticky and in winter under freezing conditions when ice between the wall and the strip forms a link between them. Obviously, the sticking is an undesired phenomenon deteriorating wiping properties of the wiper blade.

Preferably, the wiper blade includes opposing longitudinal grooves on its longitudinal sides, in which grooves spaced-apart longitudinal strips of the carrier element are disposed, wherein the grooves are open towards their longitudinal sides that face away from each other, and wherein each groove is defined by a longitudinal web of the wiper blade located between the two opposing grooves and by two longitudinal, laterally extending shoulders of the wiper blade, wherein longitudinal walls of the shoulders facing towards the strips and/or longitudinal sides of the strips facing towards the shoulders are provided with a noise dampening profile along at least a part of their length. the noise dampening profile may be formed on the longitudinal walls of the shoulders facing towards the strips or on the longitudinal sides of the strips facing towards the shoulders or on both the longitudinal walls of the shoulders facing towards the strips and on the longitudinal sides of the strips facing towards the shoulders. Preferably, the noise dampening profile is an integral part of the longitudinal walls of the shoulders facing towards the strips and/or the longitudinal sides of the strips facing towards the shoulders. the noise dampening profile has the unexpected advantage that sticking of the longitudinal walls (particularly made of an elastomer material) onto the strips is avoided or at least significantly reduced both in summer under hot conditions when the material of the shoulders becomes soft and sticky and in winter under freezing conditions when ice between the longitudinal walls and the strips forms a link between them. Obviously, the sticking is an undesired phenomenon deteriorating wiping properties of the wiper blade.

More in particular, also the longitudinal web comprises a noise dampening profile engaging the strips.

In a preferred embodiment of a windscreen wiper device according to the invention the noise dampening profile extends along their entire length. In other words, the noise dampening profile extends along the entire length the longitudinal walls of the shoulders facing towards the strips and/or the longitudinal sides of the strips facing towards the shoulders.

In another preferred embodiment of a windscreen wiper device in accordance with the invention the longitudinal walls of the shoulders facing towards the strips are provided with the noise dampening profile, wherein the noise dampening profile comprises several ribs engaging the strips, and wherein adjacent ribs define an noise trapping chamber. the noise trapping chamber is thus formed between neighboring ribs of the noise dampening profile. The significant "rattling" noise waves or reversal noise waves resulting from the oscillatory movement of the wiper blade along the windscreen to be wiped are thus trapped or locked in the chamber or cavity avoiding noise propagation. the ribs preferably extend in longitudinal direction of the wiper blade, more preferably along the entire length thereof. the noise trapping chamber then also extends in longitudinal direction of the wiper blade, as if it were a channel.

In another preferred embodiment of a windscreen wiper device according to the invention in cross-sectional view of the wiper blade the chamber has a trapezoidal form. In another preferred embodiment in cross-sectional view of the wiper blade the chamber has a curved form.

In another preferred embodiment of a windscreen wiper device in accordance with the invention the ribs are tapered towards the strips. the ribs particularly each allow a linear contact surface with the strips wherein the contact surface extends in longitudinal direction of the wiper blade, and wherein the contact surface is smaller than in the prior art.

In another preferred embodiment of a windscreen wiper device according to the invention the wiper blade comprises a elongated upper holding part and an elongated lower wiping part, wherein the holding part holds the longitudinal strips, wherein the wiping part comprises a wiping lip, and wherein the holding part and the wiping part are interconnected by means of a tilting web. The holding part, the wiping part and the tilting web of the windscreen wiper device are preferably made in one piece.

THE DRAWINGS

The invention will now be explained in more detail with reference to figures illustrated in a drawing, wherein:

FIG. 2a is a cross-sectional view of a wiper blade according to the prior art, while FIG. 2b is an enlarged detail thereof, and while FIG. 2c is a perspective view of the wiper blade without flexors.

Figure 4:
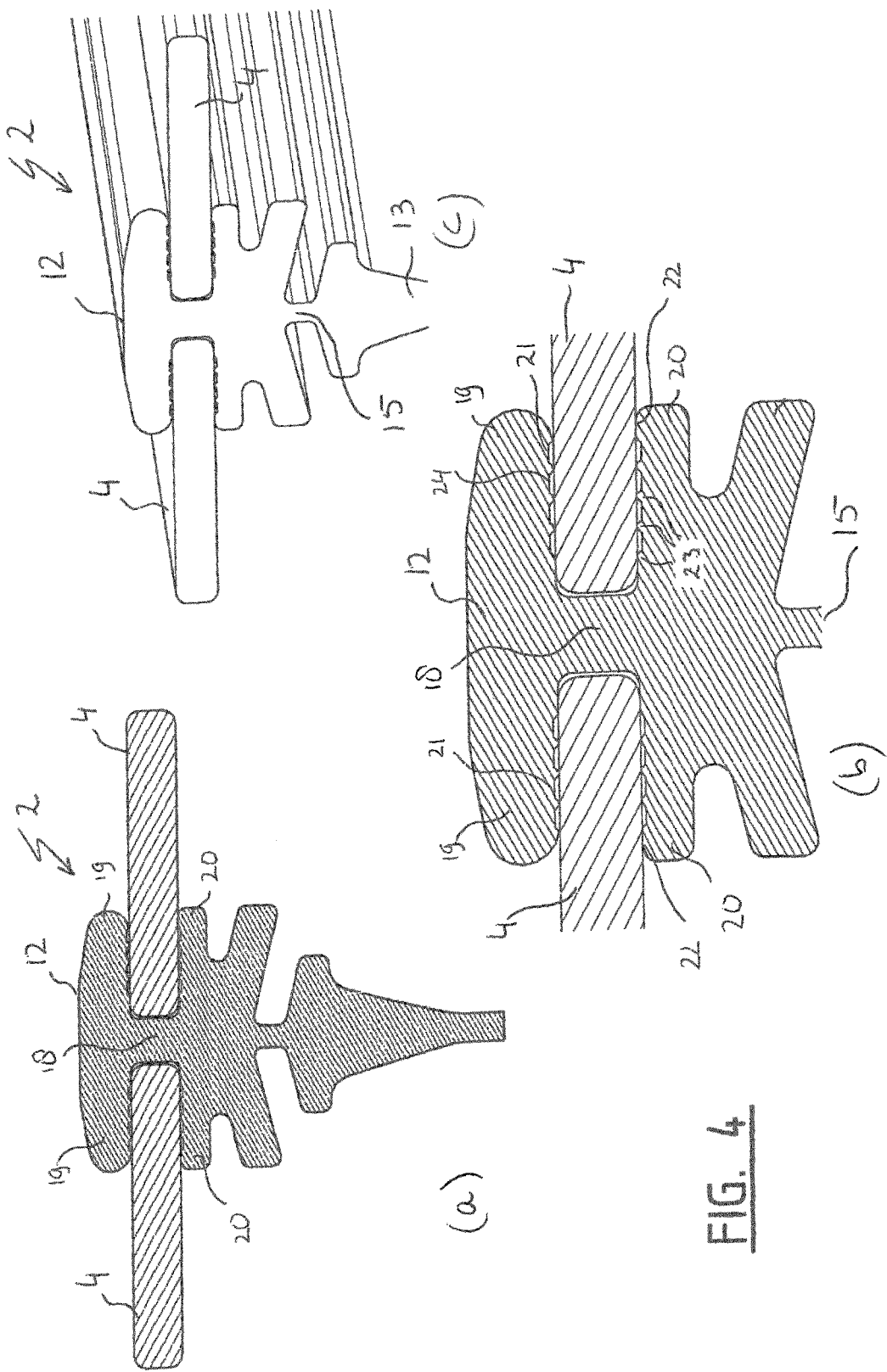
Figure 5:
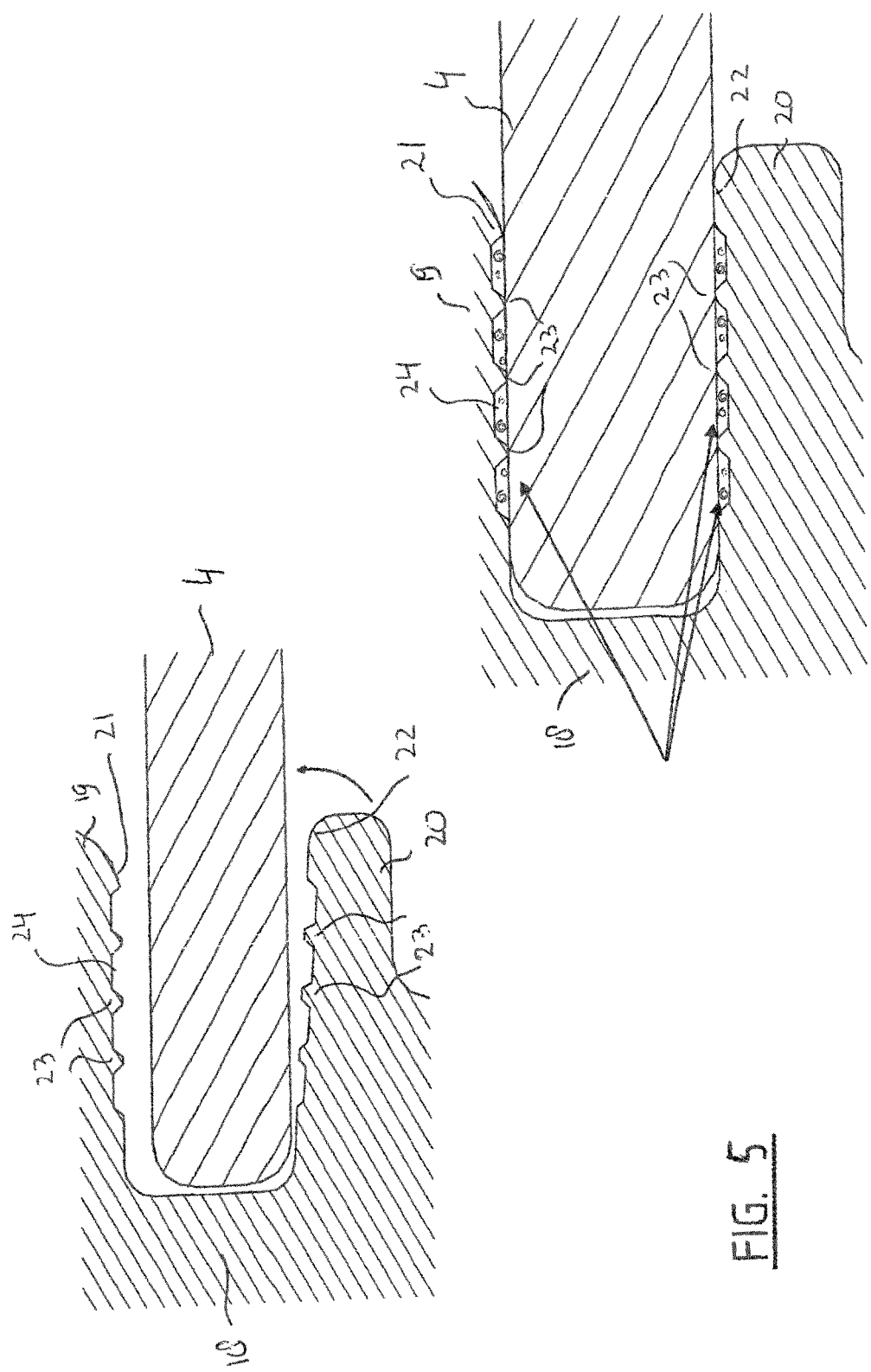

FIGS. 4a-4c correspond to FIGS. 2a-2c, but now referring to a second preferred embodiment of the present invention, while the wiper blade of FIG. 4c contains flexors; and FIG. 5 shows details of FIG. 4c.

DETAILED DESCRIPTION

Figure 1:
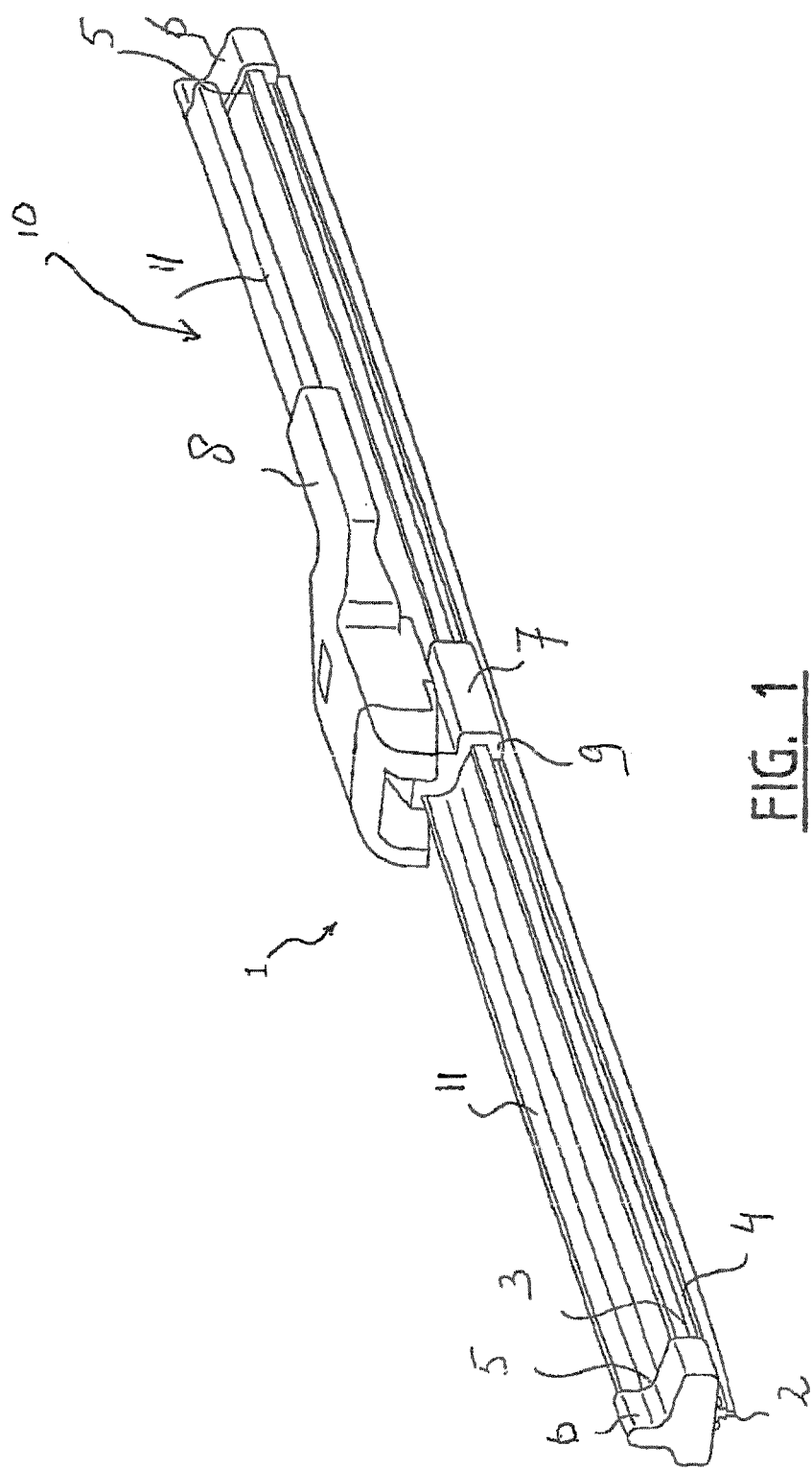
FIG. 1 is a total perspective, schematic view of a windscreen wiper device according to the invention.

FIG. 1 shows a preferred variant of a windscreen wiper device 1 according to the invention. the windscreen wiper device is built up of an elastomeric wiper blade 2, in the longitudinal sides of which opposing longitudinal grooves 3 are formed, and of longitudinal strips 4 made of spring band steel, which are fitted in the longitudinal grooves 3. the strips 4 form a flexible carrier element for the rubber wiper blade 2, as it were, which is thus biassed in a curved position (the curvature in operative position being that of a windscreen to be wiped). Neighbouring ends 5 of strips 4 are interconnected on either side of the windscreen wiper device 1 by means of connecting pieces 6 or end caps functioning as clamping members. In this embodiment, the connecting pieces 6 are separate constructional elements, which may be form-locked as well as force-locked to the ends 5 of strips 4. In another preferred variant, the connecting pieces 6 are in one piece with the strips 4 made of spring band steel. In the latter case the connecting pieces form transverse bridges for the strips 4, as it were. The windscreen wiper device 1 is furthermore built up of a connecting device 7 of plastic or metallic material for an oscillating wiper arm 8. Connecting device 7 comprises clamping members 9 that are integral therewith, which engage round longitudinal sides of the strips 4 that face away from each other, as a result of which the connecting device 7 is firmly attached to the unit consisting of wiper blade 2 and strips 4. The oscillating wiper arm 8 is pivotally connected to the connecting device 7 about a pivot axis near one end. A spoiler or "air deflector" 10 is included and comprises two separate sub-spoilers 11. Each sub-spoiler 11 is detachably connected in its entirety to the wiper blade 2 on opposite sides of the connecting device 7.

In FIG. 2a a cross-sectional view of a wiper blade according to the prior art is shown, wherein corresponding parts have been designated with the same reference numerals. As can be seen from FIG. 2a, the rubber wiper blade 2 consists of an elongated upper holding part 12 holding the longitudinal strips 4 in the grooves 3 formed therein, an elongated lower wiping part 13 having a wiping lip 14, as well as an intermediate "strip-like" titling web 15 interconnecting the holding part 12 and the wiping part 13. Again, the holding part 12, the wiping part 13 and the tilting web 15 are in one piece of rubber. the tilting web 15 defines slits or grooves 16 on opposite sides thereof. As indicated by reference numeral 17, in the prior art there is a plane surface contact between the strips 4 and the rubber material of the wiper blade 2.

Figure 2:
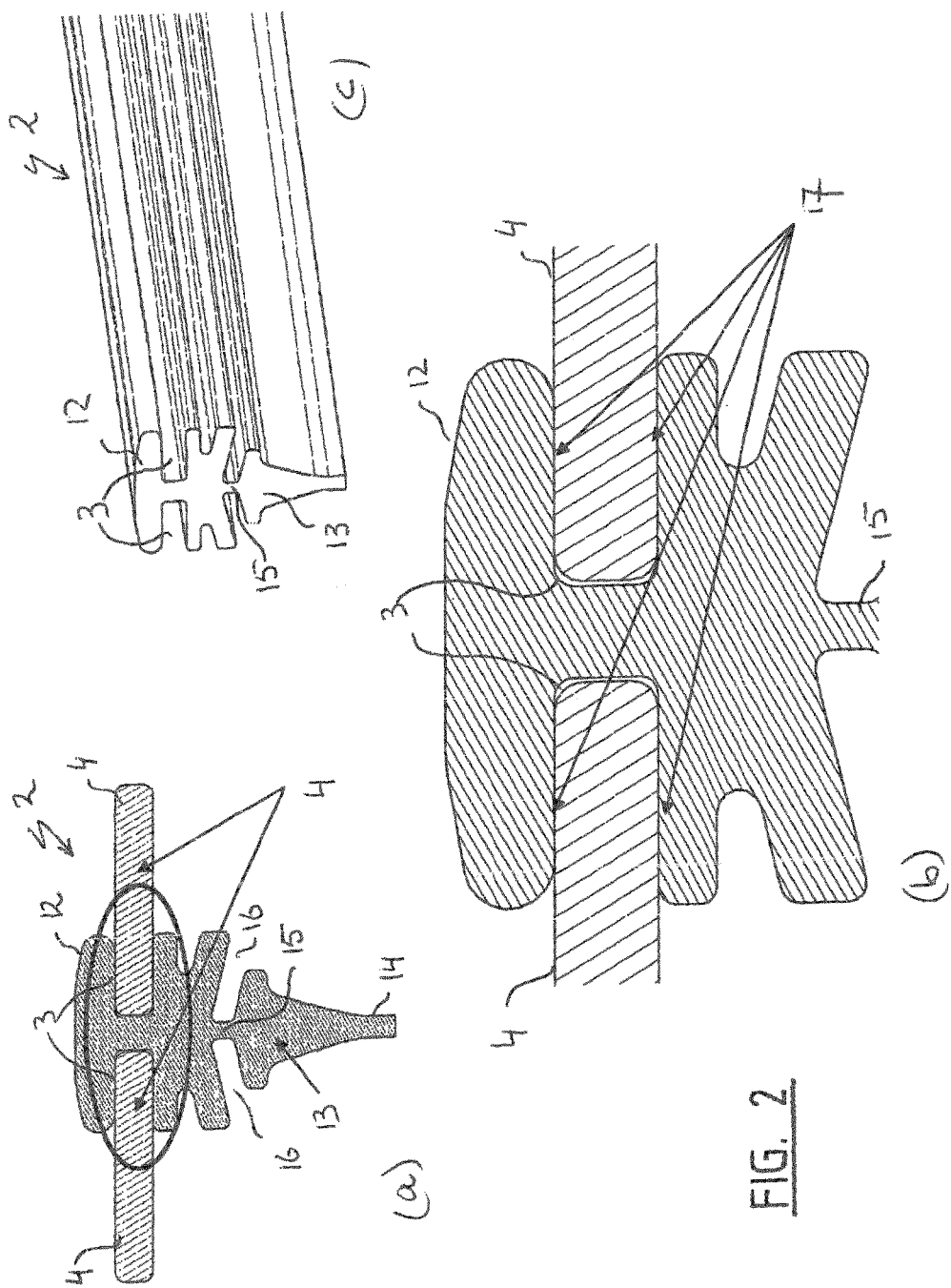

Although not shown in FIGS. 1 and 2, but fully understood by a skilled person, the oscillating arm 8 is connected to a mounting head fixed for rotation to a shaft driven by a small motor. In use, the shaft rotates alternately in a clockwise and in a counter-clockwise sense carrying the mounting head into rotation also, which in turn draws the oscillating arm 8 into rotation and by means of the connecting device 7 moves the wiper blade 2. The tilting web 15 then acts as an intermediate part subjected to a force in accordance with the wiping direction. the force acts solely on the tilting web 15, so that the wiping lip 14 attached to the wiping part 13 is guided in opposite direction to the wiping direction. As already explained above, the oscillatory movement of the wiping lip 14 along the windscreen to be wiped results in a "rattling" noise (that is a so-called "reversal noise"), particularly as a consequence of the wiping lip 14 being tumbled over at each turning point of its oscillatory movement.

In order to reduce the noise a noise dampening profile is provided, as explained below.

Figure 3:
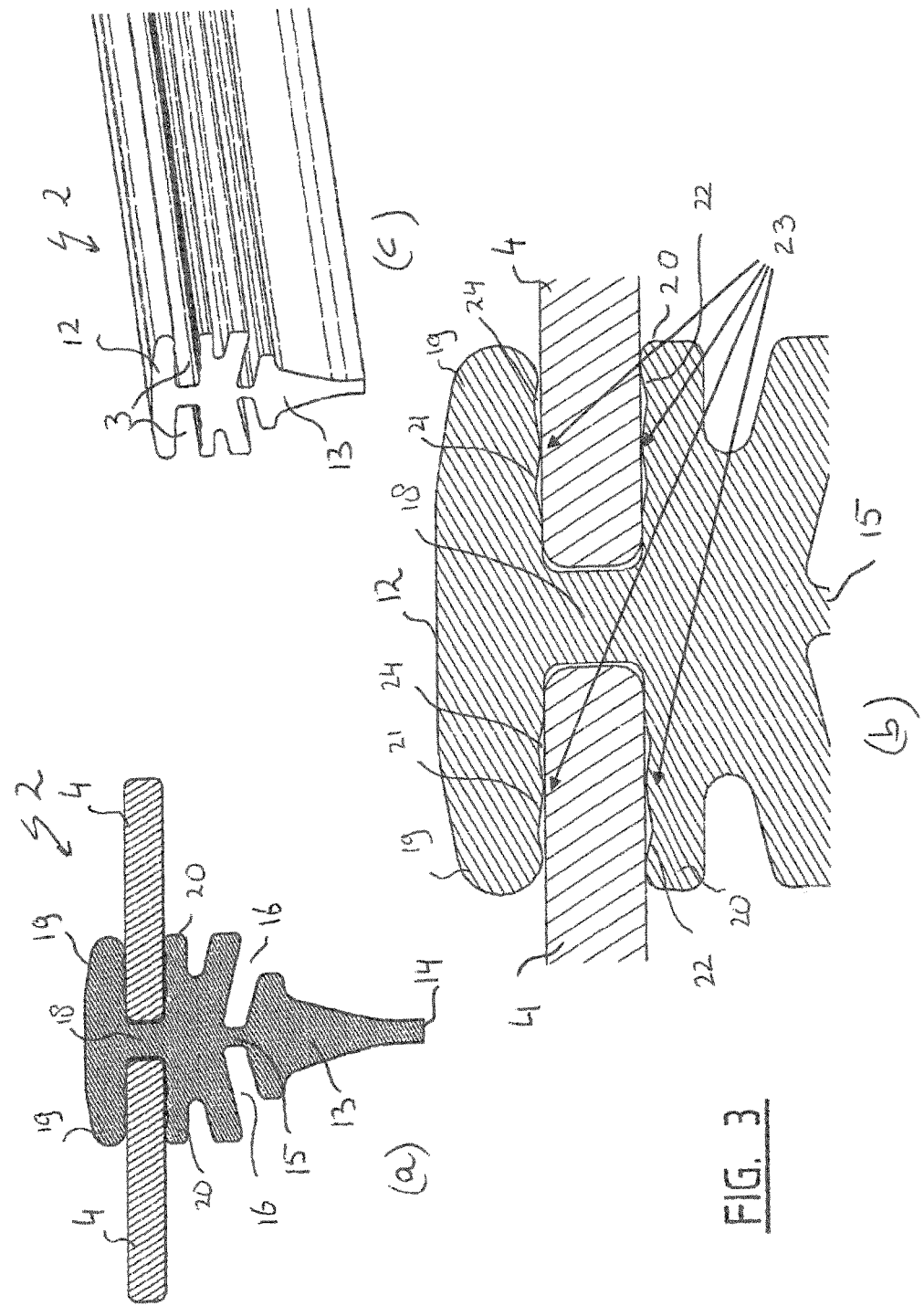
FIGS. 3a-3c correspond to FIGS. 2a-2c, but now referring to a first preferred embodiment of the present invention as used in the windscreen wiper device of FIG. 1.

In FIGS. 3, 4 and 5 parts of the wiper blade 2 according to the invention that correspond to those depicted in FIG. 2 according to the prior art are designated with the same reference numerals. Also the wiper blade 2 of the invention includes opposing longitudinal grooves 3 on its longitudinal sides, in which grooves 3 spaced-apart longitudinal strips 4 are disposed. As can be seen from FIGS. 3, 4 and 5 the grooves 3 are open towards their longitudinal sides that face away from each other, wherein each groove 3 is defined by a longitudinal web 18 of the wiper blade 2 located between the two opposing grooves 3 and by two longitudinal, laterally extending shoulders 19,20 of the wiper blade 2.

Longitudinal walls 21,22 of the shoulders 19,20 facing towards the strips 4 are provided with the noise dampening profile, wherein the noise dampening profile comprises several ribs 23 engaging the strips 4. Adjacent ribs 23 define a noise trapping chamber 24. In cross-sectional view of the wiper blade 2 the chamber 24 has a curved form (FIG. 3) or a trapezoidal form (FIGS. 4 and 5). In FIGS. 4 and 5 the ribs 23 are tapered towards the strips 4. the ribs 23 allow a contact surface along a line with the strips 4. Such a contact surface has the unexpected advantage that sticking of the longitudinal walls 21,22 (particularly made of a rubber material) onto the strips 4 is avoided or at least significantly reduced both in summer under hot conditions when the material of the shoulders 19,20 becomes soft and sticky and in winter under freezing conditions when ice between the longitudinal walls 21,22 and the strips 4 forms a bond between them.

In FIG. 5 is shown that the noise trapping chamber 24 is formed between neighboring ribs 23 of the noise dampening profile. The significant "rattling" noise waves or reversal noise waves resulting from the oscillatory movement of the wiper blade 2 along the windscreen to be wiped are trapped or locked in the chamber or cavity 24 in order to avoid noise propagation.

The invention is not restricted to the variants shown, but extends also to other preferred embodiments falling within the scope of the appended claims. A skilled person, for example, would appreciate that also such a noise dampening profile could be applied in a wiper blade 2 having only one central longitudinal groove 3 for only one longitudinal strip 4, wherein ribs 23 of the profile are preferably provided on a wall of the groove 3 facing towards the strip 4.

The invention claimed is:

1. A windscreen wiper device of the flat blade type comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein said grooves are open towards their longitudinal sides that face away from each other, and wherein each groove is defined by a longitudinal web of said wiper blade located between said two opposing grooves and by two longitudinal, laterally extending shoulders of said wiper blade, which windscreen wiper device comprises a connecting device for an oscillating arm, wherein said shoulders each include upper and lower longitudinal walls facing toward upper and lower longitudinal surfaces of said strips, respectively; and wherein for each a groove at least one of said upper and lower walls is provided with a noise dampening profile along at least a part of its length and wherein said noise dampening profile comprises several ribs engaging said strips, and wherein adjacent ribs define a noise trapping chamber, and wherein said ribs and said noise trapping chamber extend lengthwise in a longitudinal lengthwise direction of said wiper blade.

2. A windscreen wiper device according to claim 1, wherein said noise dampening profile extends along the entire length of said groove.

3. A windscreen wiper device according to claim 1, wherein in cross-sectional view of said wiper blade said chamber has a trapezoidal form.

4. A windscreen wiper device according to claim 1, wherein in cross-sectional view of said wiper blade said chamber has a curved form.

5. A windscreen wiper device according to claim 1, wherein said ribs are tapered towards said strips.

6. A windscreen wiper device according to claim 1, wherein said ribs each allow a linear contact surface with said strips.

7. A windscreen wiper device according to claim 1, wherein said wiper blade comprises an elongated upper holding part and an elongated lower wiping part, wherein said holding part holds said longitudinal strips, wherein said wiping part comprises a wiping lip, and wherein said holding part and said wiping part are interconnected by means of a tilting web.

8. A windscreen wiper device according to claim 1, wherein said noise damping profile is provided on at least said lower longitudinal wall of each groove.

9. A windscreen wiper device according to claim 1, wherein said noise dampening profile is provided on said lower and said upper walls of each groove.

* * * * *